No. 706,614. Patented Aug. 12, 1902.
E. D. WALLIS.
CORN HARVESTER.
(Application filed June 22, 1901.)
(No Model.) 3 Sheets—Sheet 3.
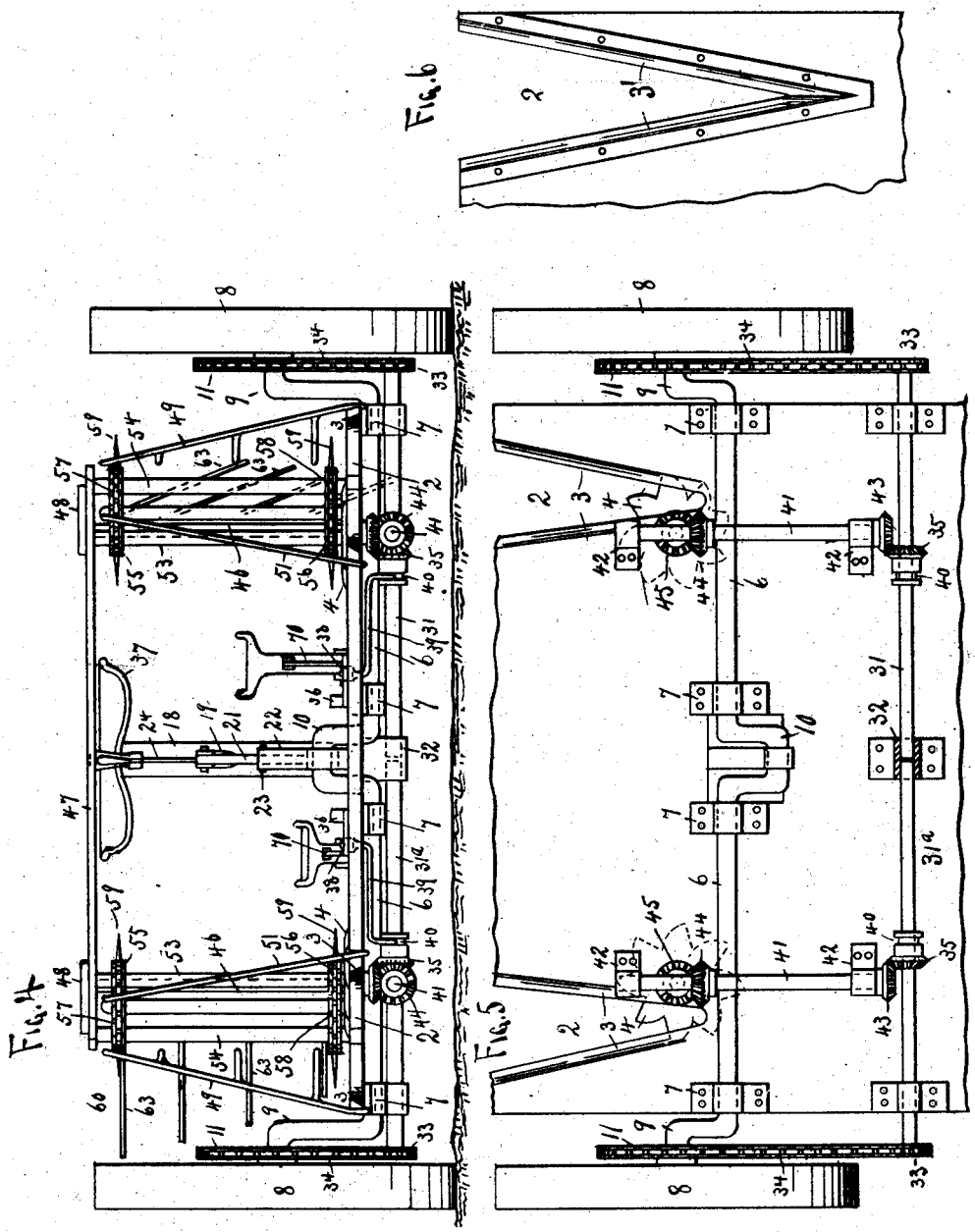
Witnesses
C. N. Woodward.
J. W. Garner
E. D. Wallis, Inventor
by C. A. Snow & Co.
Attorneys

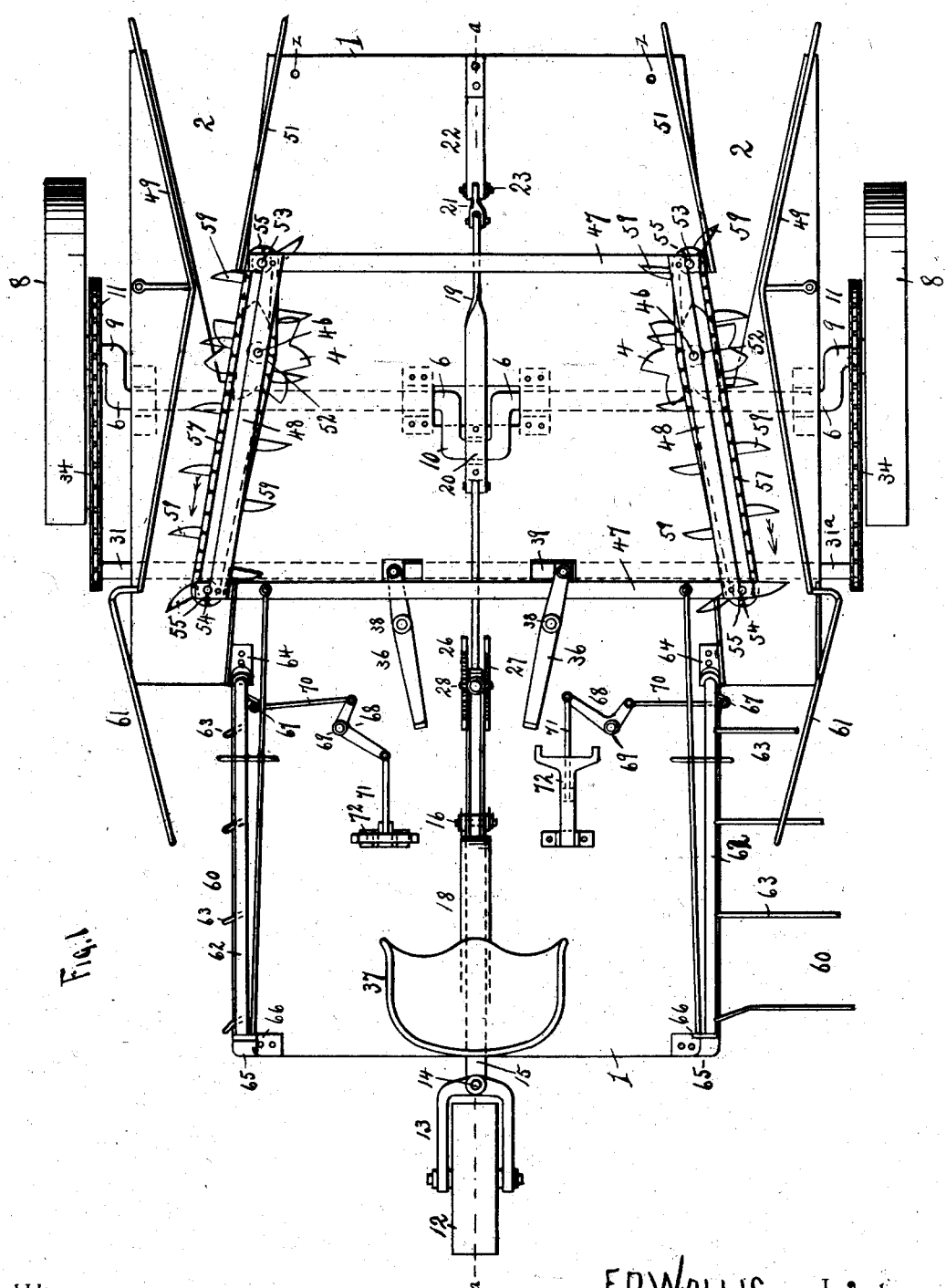

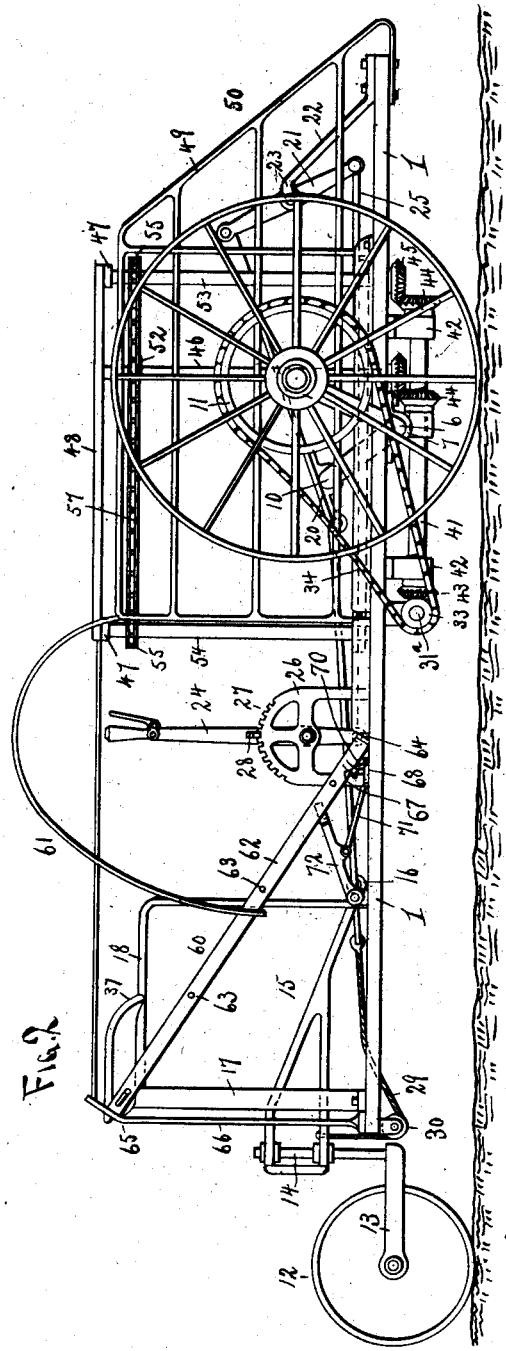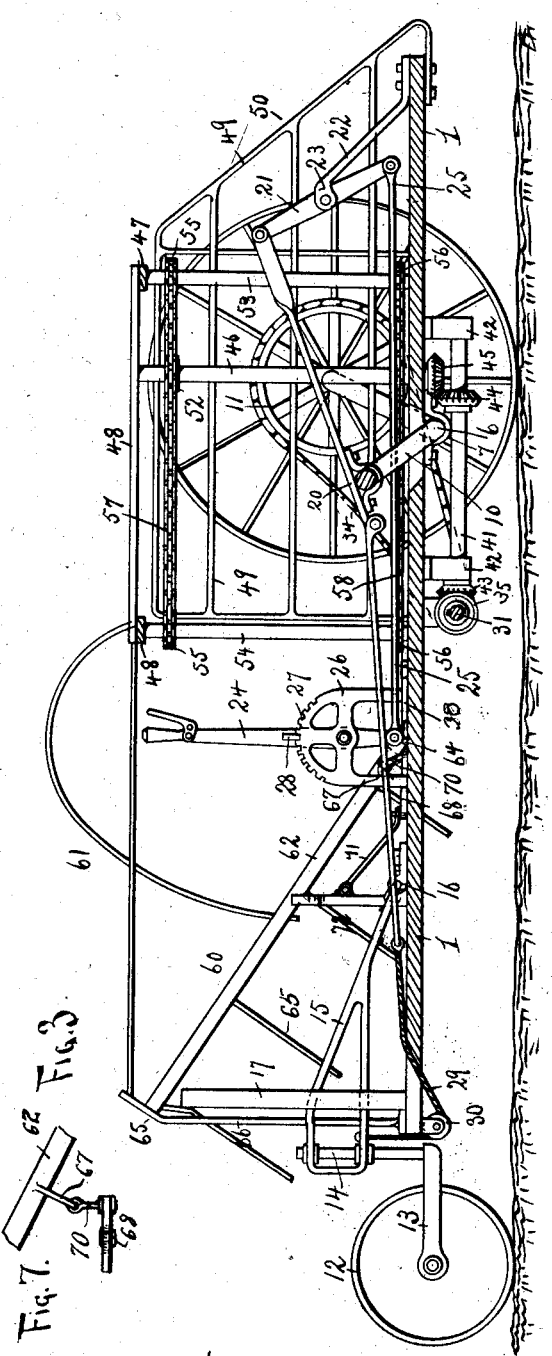

UNITED STATES PATENT OFFICE.

EDWARD D. WALLIS, OF BLUEMOUND, KANSAS.

CORN-HARVESTER.

SPECIFICATION forming part of Letters Patent No. 706,614, dated August 12, 1902.

Application filed June 22, 1901. Serial No. 65,671. (No model.)

*To all whom it may concern:*

Be it known that I, EDWARD D. WALLIS, a citizen of the United States, residing at Bluemound, in the county of Linn and State of Kansas, have invented a new and useful Corn-Harvester, of which the following is a specification.

My invention is an improved corn-harvester; and it consists in the peculiar construction and combination of devices hereinafter fully set forth and claimed.

In the drawings, Figure 1 is a top plan view of a corn-harvester embodying my improvements. Fig. 2 is a side elevation of the same. Fig. 3 is a vertical longitudinal sectional view of the same, taken on a plane indicated by the line $a\,a$ of Fig. 1. Fig. 4 is a front elevation of the same. Fig. 5 is a partial inverted plan view. Fig. 6 is a similar detail view of a modified form of cutting apparatus. Fig. 7 is a detail side elevation showing a portion of one of the dump-carriers and its connections.

The platform 1 is preferably of the form here shown, but may be of any suitable construction. The same is provided on opposite sides at its front end with rearwardly-converging guideways 2. The width between the said guideways is equal to the width of the space between two rows of corn. On opposite sides of the said guideways are suitable cutters. As shown in Figs. 1 and 5, the said guideways are provided on their outer sides with stationary cutter-blades 3 and on their inner sides at the rear ends of said guideways with revoluble cutters 4. Said cutters 3 and 4 coact, as will be understood. Within the scope of my invention, however, I may dispense with the revoluble cutters 4 and provide the guideways 2 with stationary cutting-blades 3', as shown in Fig. 6. Hence I do not desire to be limited in this particular.

The axle 6, which supports the front portion of the machine, is journaled in suitable bearings 7 on the under side of the platform. The ends of the said axle, on which the ground-wheels 8 revolve, are cranked, as at 9. A crank 10 is also formed in the central portion of the axle. A sprocket-wheel 11 revolves with each of the ground-wheels 8. It will be understood that by turning the axle 6, which is adapted to oscillate in its bearings, the front end of the platform may be raised or lowered, as may be desired.

The rear end of the harvester is supported by a trail-wheel 12, which has its bearing in a fork 13. The said fork has at its front end a vertical spindle 14, which is journaled in bearings in the rear end of an arm 15. The front end of said arm is pivotally connected to the platform, as at 16. Said arm 15 is at its rear end movable vertically in a guide 17. Preferably and as here shown said guide forms a portion of a seat-supporting frame 18.

A link-rod 19 is connected to the crank 10 of axle 6 in any suitable manner, either as shown at 20 or otherwise. A link-lever 21 is fulcrumed to a support 22, as at 23. The front end of the link-rod 19 is pivotally connected to the upper end of the said link-lever. The lower end of the latter is connected to the lower end of a hand-lever 24 by a rod 25. Said hand-lever is fulcrumed to a suitable support on the central portion of the platform, which support 26 has a segment-rack 27. Said hand-lever has a spring-pressed locking-dog 28 of the usual construction to engage said segment-rack, and thereby lock said hand-lever in any desired position. A flexible connecting element 29, as a cord or chain, is attached to the rear portion of the arm 15 and to the link-rod 19, being thereby connected to the crank 10 of the axle, and said flexible connecting element passes under and engages a direction-sheave 30. From the foregoing it will be understood that by operating the hand-lever 24 the axle 6 and arm 15 may be simultaneously moved to raise and lower the front and rear ends of the platform, and thereby adjust the latter to any desired height.

No means are here shown to keep the chains 34 taut, as in practice such chains admit of the required angular adjustments of the axle; but any suitable chain-tighteners, such as are well known to persons skilled in the mechanic arts, may be employed in connection with the chains 34, if necessary or desirable.

A power-shaft 31 is disposed transversely under the platform at a suitable distance in rear of the axle 6 and is journaled in bearings 32. The said power-shaft is in two sections 31 31ª, and each section is revoluble independently of the other. At the outer end of each section of power-shaft 31 is a sprocket-wheel 33. Said sprocket-wheels are connected by endless chains 34 to the sprocket-wheels 11. On each section of the power-shaft 31 is splined a miter-gear 35. Said miter-gears are longitudinally movable on the said power-shaft. I provide foot-levers 36, which are disposed on the platform in proximity to the driver's seat 37, which foot-levers are fulcrumed, as at 38, and connected by links 39 to annular grooves 40 in the hub or sleeve portions of said gears 35. Longitudinally-disposed counter-shafts 41 are journaled in bearings 42 on the under side of the platform. Said counter-shafts have at their rear ends gears 43, which may be engaged by the gears 35 to communicate power from shaft 31 to said counter-shafts, or said gears 35 may by the levers 36 be moved out of engagement with said gears 43. Hence power may be conveyed from the shaft 31 to both of the counter-shafts 41 or to either of them at the will of the operator. At the front end of each counter-shaft 41 is a miter gear-wheel 44. Said gears 44 engage similar gears 45 on the lower ends of vertically-disposed shafts 46. Hence power may be conveyed to said shafts 46. The revoluble cutters 4 are fast on the said shafts 46, and hence are operated by them. A suitable frame 47 is erected on the platform, near the front end thereof. Said frame has bearings 48 for the upper ends of said shafts 46. The sides of the said frame 47 are disposed at an angle, as shown in Fig. 1, and opposite the same and at a suitable distance therefrom are guide-frames 49, which are supported on the sides of the front portion of the platform. Said frames 49 and the sides of said frame 47 form guideways between which the cornstalks pass after they have been cut. The front ends of the frames 49 are disposed obliquely and extend outwardly, as at 50 in Fig. 1, and oppositely-disposed guides 51 are connected to the front end of the frame or platform 1 and to the upper portion of the frame 47 at the front corners thereof. The shafts 46 are each provided near its upper end with a sprocket-wheel 52. The shafts 53 54, which are vertically disposed, are respectively placed at a suitable distance in advance and rear of the shafts 46. The lower ends of said shafts 53 54 are journaled in bearings in the platform, and the upper ends thereof are journaled in bearings in the front and rear corners of the frame 47. The said shafts 53 54 are provided near their upper ends with sprocket-wheels 55 and near their lower ends with sprocket-wheels 56. Each pair of shafts 53 54 are connected together near their upper ends by an endless sprocket-chain 57, which engages and connects the sprocket-wheels 55, and similar endless sprocket-chains 58 connect the sprocket-wheels 56. Said sprocket-chains 57 58 form endless traveling carriers, which operate in the direction indicated by the arrows in Fig. 1, and said carrier-chains are preferably provided with projecting spurs 59, which engage the stalks of corn prior to their being cut, continuing in engagement with them after the stalks have been cut, and move the cut stalks rearwardly after having been cut, as will be understood, and deliver the same onto dump-carriers 60. Fenders 61 at the rear ends of the frames 49 serve to direct the cut stalks as they fall from the carrier-chains onto the dump-carriers 60.

Each of the dump-carriers 60 comprises a longitudinally-disposed inclined revoluble shaft 62 and arms 63, which project therefrom. The said shafts 62, which form the inner sides of the dump-carriers, have their lower ends journaled in suitable bearings 64 on the sides of the platform and their rear upper ends journaled in suitable bearings 65 at the rear upper corners of side frames 66 on the platform.

Each shaft 62 has a rock-arm 67. On the platform are fulcrumed bell-crank levers 68, as at 69, having arms of unequal lengths. The shorter arms of said bell-crank levers are connected by links 70 to said rock-arms 67. The long arms of said bell-crank levers are connected by links 71 to foot-levers 72. It will be understood that by means of the said foot-levers and their connections the said dump-carriers may be sustained in position when being loaded and turned when a sufficient quantity of cornstalks has accumulated thereon to form bundles to drop the said cut cornstalks in bundles on the ground as the machine advances by simply releasing the foot-levers.

The carrier-chains 57 engage the sprocket-wheels 52 on shafts 46. Hence power is communicated to said carrier-chains 57 and also to the carrier-chains 58.

Shafts or equalizers may be attached to the front end of the platform at the points indicated at z to enable the machine to be drawn by a horse or team.

Having thus described my invention, I claim—

1. In a machine of the class described, the combination of a main frame, an oscillating supporting-axle, having cranks on which the supporting-wheels are mounted and provided further with an operating-crank, a rocking arm, a supporting-wheel carried thereby, a lever, and connections between said lever and said rocking arm and operating-crank, whereby said rocking arm and oscillating cranked axle may be simultaneously operated, to raise or lower said main frame, substantially as described.

2. In a machine of the class described, the combination of a main frame, an oscillating supporting-axle having cranks on which the supporting-wheels are mounted and provided further with an operating-crank, a rocking arm, a supporting-wheel carried thereby, a link-lever connected to said operating-crank and to said rocking arm, a lever connected to said link-lever, and means to lock said lever at any desired adjustment, substantially as described.

3. In a corn-harvester, the combination with a cutter, carrier, and guides for the cut cornstalks, of a dump-carrier to receive the cut stalks, said dump-carrier being pivotally mounted at its inner side and having a depending rock-arm, a foot-lever and connections therebetween whereby upon the downward pressure of the foot-lever said rock-arm is thrust outward, for the purpose set forth, substantially as described.

In testimony that I claim the foregoing as my own I have hereto affixed my signature in the presence of two witnesses.

EDWARD D. WALLIS.

Witnesses:
C. L. PORTER,
A. O. LACEY.